United States Patent
Harano et al.

(10) Patent No.: US 6,233,078 B1
(45) Date of Patent: May 15, 2001

(54) PHOTO SIGNAL AMPLIFICATION TRANSMISSION SYSTEM

(75) Inventors: Hiroshi Harano; Naoki Maruyama, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/063,674

(22) Filed: Apr. 21, 1998

(30) Foreign Application Priority Data

Apr. 25, 1997 (JP) ..................................... 9-121504

(51) Int. Cl.[7] ....................................... H04J 14/02
(52) U.S. Cl. .................. 359/134; 359/124; 359/337; 359/341
(58) Field of Search ...................... 359/134, 124, 359/160, 341, 179, 187, 337

(56) References Cited

U.S. PATENT DOCUMENTS

| 5,463,487 | * | 10/1995 | Epworth ............................... 359/124 |
| 5,870,217 | * | 2/1999 | Itou et al. ............................. 359/179 |

FOREIGN PATENT DOCUMENTS

| 0 467 396 A2 | 1/1992 | (EP) . |
| 0 637 148 A1 | 2/1995 | (EP) . |
| 0 812 078 A2 | 12/1997 | (EP) . |
| 7-143062 | 6/1995 | (JP) . |
| 8-195972 | 7/1996 | (JP) . |
| 9-116506 | 5/1997 | (JP) . |
| 10-22980 | 1/1998 | (JP) . |
| 10-51057 | 2/1998 | (JP) . |

\* cited by examiner

Primary Examiner—Kinfe-Michael Negash
(74) Attorney, Agent, or Firm—Scully Scott Murphy & Presser

(57) ABSTRACT

In a conventional photo signal amplification transmission system, since control is performed to make constant an output power, total output powers of all wavelengths are made constant when a multi-wavelength transmission is made. An output power of one wavelength is decreased and deviated from an optimum power. To solve the problem, a transmission photo amplifier 3, a relay photo amplifier 4 and a receiving photo amplifier 5 are provided with wavelength number information management sections 11, 12 and 13, respectively. An amplifying means is controlled in accordance with the number of wavelengths of the multi-wavelength signal which is obtained by the wavelength number information management sections. The wavelength number information management sections 11 to 13 multiplex a wavelength number information signal onto an optical fiber cable 6 and renews the signal.

7 Claims, 2 Drawing Sheets

PHOTO SIGNAL AMPLIFICATION TRANSMISSION SYSTEM

BACKGROUND OF THE INVENTION

1. Field of the Invention

The present invention relates to a photo signal amplification transmission system for amplifying a photo signal (multi-wavelength signal) constituted of plural multiplexed signals having different wavelengths which are transmitted through an optical fiber cable, and particularly to a control over an amplitude in accordance with the number of multiplexed wavelengths.

2. Description of the Prior Art

As is well known, when a photo signal is transmitted over a long distance by using an optical fiber cable, a failure occurs on a receiving side even if output power is. too low or too high. Therefore, an optimum output power is required.

Therefore, in the long-distance transmission of the photo signal by means of the optical fiber cable, in general a relay amplifying device is installed at each relay point, so that amplification is performed to obtain the optimum output power.

FIG. 1 is a block diagram showing a conventional photo signal amplification transmission system.

In FIG. 1, numeral 31 denotes a WDM (wavelength division multiplex) photo coupler for combining an input signal from IN and an activating laser beam; 32 denotes an erbium doped fiber (EDF) for amplifying a photo signal when an activating light is injected; 33 denotes an output monitoring photo coupler; 34 denotes an activating laser beam source (referred to as the activating LD); 35 denotes an automatic output power control (APC) circuit; and 36 denotes an output monitoring photo detector(PD).

In the conventional photo signal amplification transmission system, for example at a relay point, as shown in FIG. 1, the EDF 32 and the activating LD 34 constitute an optical fiber amplifier. An output level is monitored by the output monitoring photo coupler 33. The monitored output level is compared with a predetermined optimum value (fixed value). Then, the activating LD34 is feedback-controlled by the APC 35 in such a manner that the output level reaches the optimum value.

In the conventional photo signal amplification transmission system, since the output power is generally controlled to reach the predetermined optimum value (fixed value), a problem occurs when the photo signal (multi-wavelength signal) constituted of plural multiplexed signals having different wavelengths is transmitted.

Specifically, in the conventional system, even the multi-wavelength signal is controlled as one signal in such a manner that it reaches the predetermined fixed value. Therefore, in the case of one wavelength (one signal), the output power is largely varied in accordance with the number of multiplexed wavelengths.

For example, as the number of multiplexed wavelengths is increased, the light output power for one wavelength is decreased. Therefore, when multiple signals (wavelengths) are multiplexed, the light output power for one wavelength is weakened to a degree to which a dynamic range of a receiver cannot be followed. As a result, an error in transmission of the photo signal or another problem arises.

SUMMARY OF THE INVENTION

Wherefore, an object of the invention is to provide a photo signal amplification transmission system in which a light output power is controlled in accordance with the number of multiplexed wavelengths and finally a light power of each signal received by a receiver can be optimized.

To attain this and other objects, the invention provides a photo signal amplification transmission system in which at a transmission end a photo signal to be transmitted via an optical fiber cable is amplified to a desired level before transmitted, wherein when the photo signal to be transmitted is a multi-wavelength signal constituted of plural multiplexed signals having different wavelengths, an amplifying means is controlled in accordance with the number of wavelengths, and the photo signal is batch-amplified to the desired level in accordance with the number of wavelengths before transmitted.

The invention also provides a photo signal amplification transmission system in which at a relay point a photo signal transmitted via an optical fiber cable is amplified to a desired level before transmitted, wherein the photo signal amplification transmission system is provided with a wavelength number information management section which receives and transmits wavelength number information, when the transmitted photo signal is a multi-wavelength signal constituted of plural multiplexed signals having different wavelengths, an amplifying means is controlled in accordance with the number of wavelengths which is obtained by the wavelength number information management section, and the photo signal is batch-amplified to the desired level in accordance with the number of wavelengths before transmitted.

The invention further provides a photo signal amplification transmission system in which at a receiving end a photo signal transmitted via an optical fiber cable is amplified to a desired level, wherein the photo signal amplification transmission system is provided with a means for receiving wavelength number information, when the transmitted photo signal is a multi-wavelength signal constituted of plural multiplexed signals having different wavelengths, an amplifying means is controlled in accordance with the number of wavelengths which is obtained by the means, and the photo signal is batch-amplified to the desired level in accordance with the number of wavelengths.

Also, the wavelength number information management section at the relay point separates and receives a wavelength number information signal which is transmitted while being multiplexed on a main signal by using a wavelength different from the wavelength of the photo signal (main signal) transmitted from the transmission end via the optical fiber cable. The wavelength number information, signal is multiplexed onto the main signal which has been amplified by the amplifying means by using the wavelength different from the wavelength of the main signal, before transmitted.

Also, the means for receiving the wavelength number information at the receiving end separates and receives a wavelength number information signal which is transmitted while being multiplexed on the main signal by using a wavelength different from the wavelength of the photo signal (main signal) transmitted from the transmission end or the relay point via the optical fiber cable.

Also, the amplifying means is provided with an activating laser beam source, a WDM photo coupler for combining an activating light from the activating laser beam source with the multi-wavelength signal and an erbium doped fiber.

Further the amplifying means is controlled in accordance with the number of wavelengths by monitoring the amplified output and transmitting the wavelength number information to an APC circuit for feedback-controlling an activating laser beam source.

In the photo signal amplification transmission system according to the invention, the information of the number of multiplexed wavelengths is managed as aforementioned. By transmitting the information together with the main signal, the multi-wavelength signal is amplified in accordance with the number of wavelengths by a transmission photo amplifier, a relay photo amplifier and a receiving photo amplifier.

Finally, a light power for each signal received by the receiver can be optimized. Therefore, a receiver with a narrow dynamic range can be used.

DETAILED DESCRIPTION OF THE PREFERRED EMBODIMENT

The invention will be described with reference to the accompanying drawings.

Figure 2:
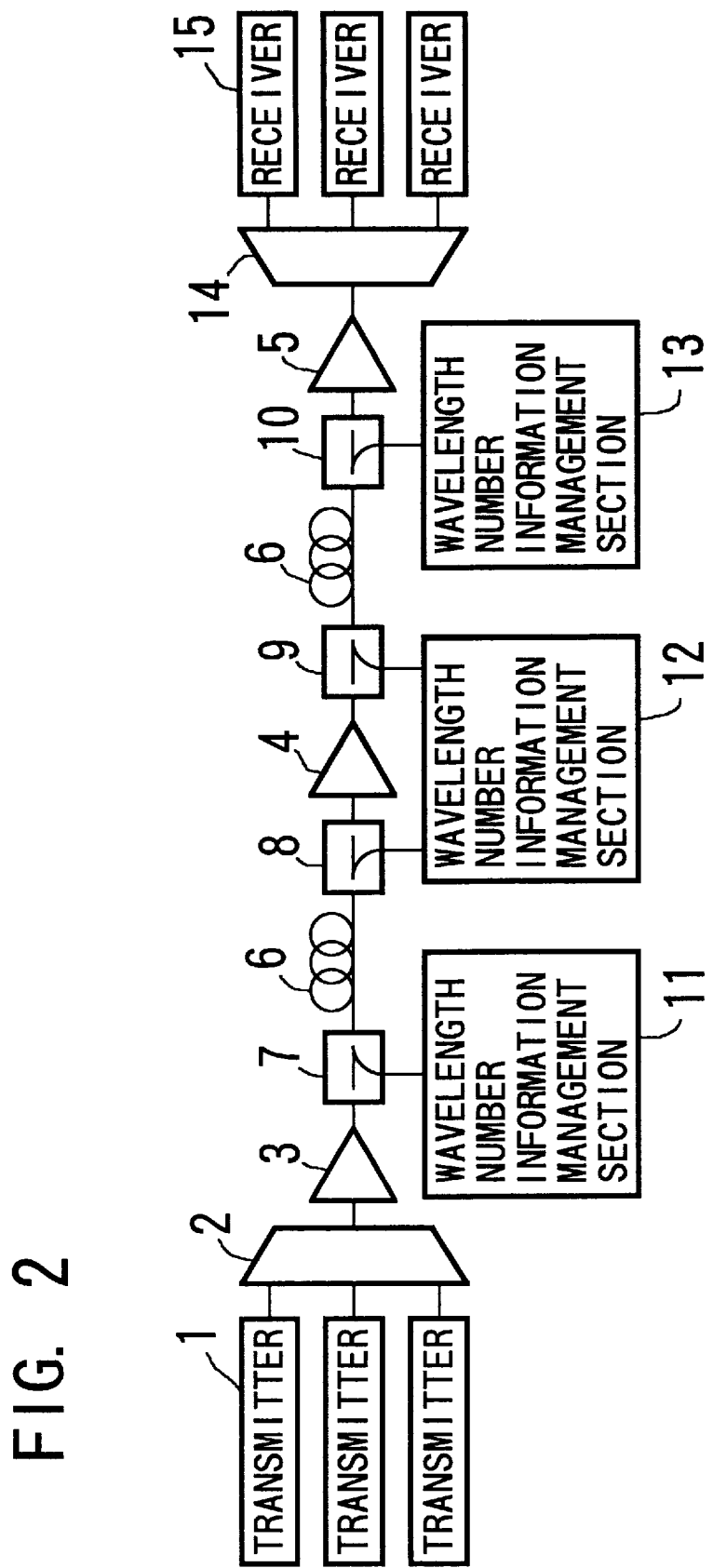
FIG. 2 is a block diagram showing an embodiment of the invention.

FIG. 2 is a block diagram showing an embodiment of the invention.

In FIG. 2, numeral 1 denotes transmitters for emitting photo signals having different wavelengths; 2 denotes a photo multiplexer for multiplexing the photo signals having different wavelengths from the transmitters 1; 3 denotes a transmission photo amplifier; 4 denotes a relay photo amplifier; 5 denotes a receiving photo amplifier; 6 denotes transmission paths constituted of optical fiber cables; 7 to 10 denote wavelength number information WDM (wavelength division multiplex) photo couplers for transmitting wavelength number information to or via the transmission paths,, 11 to 13 denote wavelength number information management sections; 14 denotes a wavelength separating section for separating the multi-wavelength signal into one-wavelength signals; and 15 denotes photo signal receivers.

Additionally, the wavelength number information management section 11 transmits a wavelength number information signal with the photo signal which uses a wavelength different from the wavelength of a main signal. The wavelength number information management section 12 receives and transmits the same signal, and the wavelength number information management section 13 receives the same signal.

Operation will be described.

Photo signals transmitted from the transmitters 1 are multiplexed by the photo multiplexer 2 to form a multi-wavelength signal, which is amplified to an optimum output power by the transmission photo amplifier 3 before being transmitted to the transmission path 6. Also in the amplification at the transmission end, the optimum output power is determined based on the number of multiplexed wavelengths. The multi-wavelength signal is amplified to the determined value before outputted.

Figure 1:
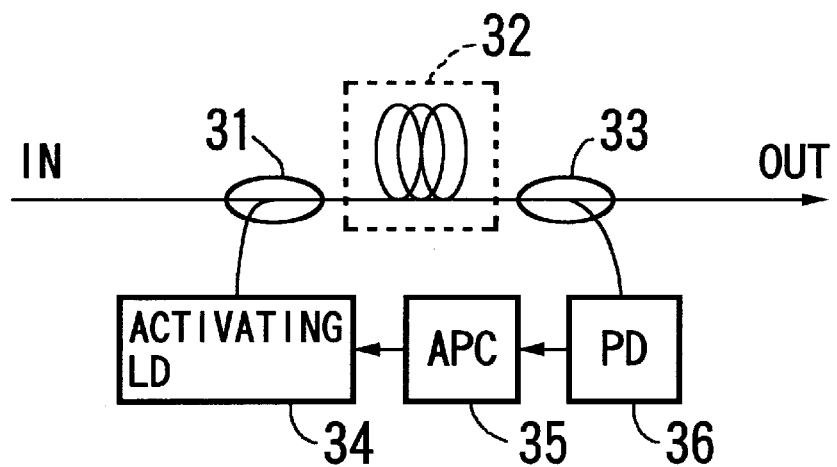
FIG. 1 is a block diagram showing a conventional photo signal amplification transmission system.
Figure 3:
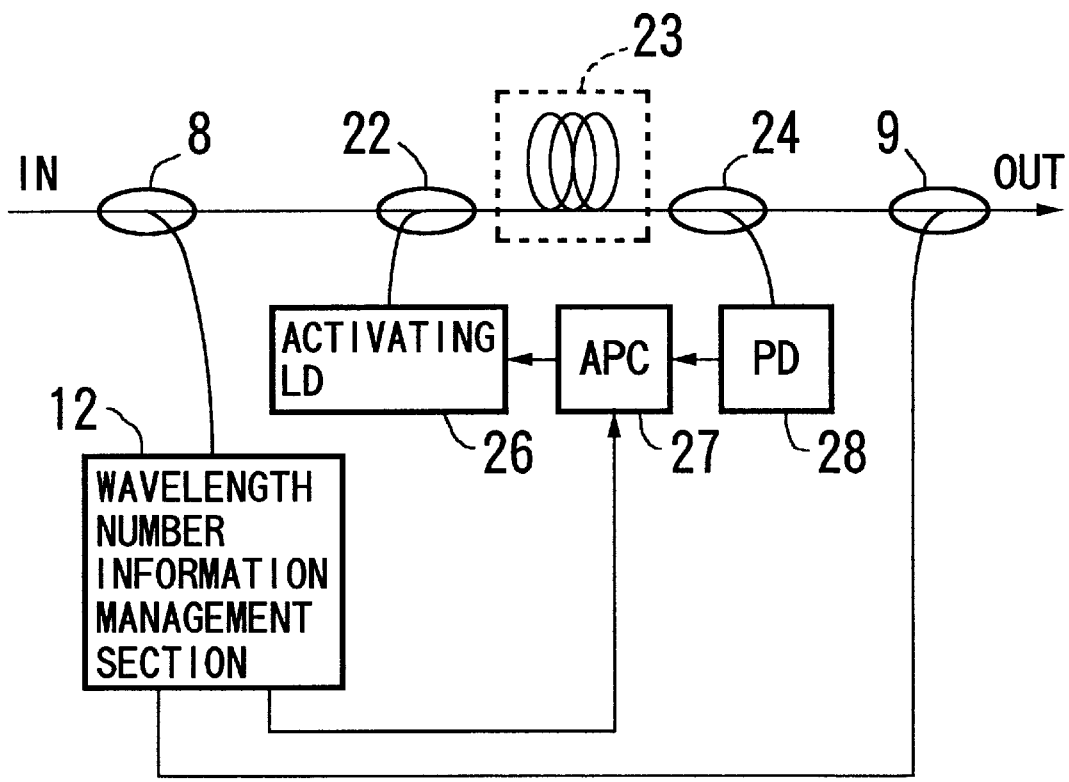
FIG. 3 is a block diagram showing an example of a constitution of a relay photo amplifier shown in FIG. 2.

Additionally, the amplification is controlled in the same manner as a control at a relay point shown in FIG. 3 by monitoring the amplified output and transmitting the wavelength number information to an APC circuit for feedback-controlling an activating laser beam source.

Then, the wavelength number information is converted to a photo signal (wavelength number information signal) which uses a wavelength different from the main signal transmitted from the wavelength number information management section 11 to the transmission path 6. The photo signal is then multiplexed onto the main signal by the WDM photo coupler 7 before transmitted.

Subsequently, the signal transmitted to the transmission path 6 is received and amplified by the relay photo amplifier 4 which is provided at the relay point. The wavelength number information signal multiplexed on the main signal is extracted by the WDM photo coupler 8 before the relay photo amplifier 4, and received by the wavelength number information management section 12. The relay photo amplifier 4 batch-amplifies the main signal in accordance with the number of wavelengths being transmitted based on the wavelength number information in such a manner that each of multiplexed wavelengths reaches an optimum power.

For example, if eight wavelengths are multiplexed in the main signal, an optimum value is eight times as large as an output value of one wavelength. The main signal is batch-amplified to the optimum value.

Subsequently, the wavelength number information received by the wavelength number information management section 12 is converted to a photo signal (wavelength number information signal) which uses a wavelength different from the wavelength of the main signal. The photo signal is multiplexed onto the main signal by the WDM photo coupler 9 which is provided after the relay photo amplifier 4, and transmitted together with the main signal.

Also at a receiving end the wavelength number information is extracted by the WDM photo coupler 10 and the wavelength number information management section 13. Based on the information, the receiving photo amplifier 5 batch-amplifies the main signal in such a manner that each of multiplexed wavelengths reaches an optimum power. The amplified main signal is separated by the wavelength separating section 14 into one-wavelength signals. The signals are received by the receivers 15, respectively.

Additionally, the amplification is controlled in the same manner as the control at the relay point shown in FIG. 3 by monitoring the amplified output and transmitting the wavelength number information to the APC circuit for feedback-controlling the activating laser beam source.

FIG. 3 is a block diagram showing a constitutional example of the relay photo amplifier 4 shown in FIG. 2.

In FIG. 3, numerals 8 and 9 denote wavelength number information WDM photo couplers; 12 denotes a wavelength number information management section; 22 denotes an activating light injecting WDM coupler; 23 denotes an erbium doped fiber (EDF) which is constituted by mixing an erbium ion in an optical fiber. When a 1.48 $\mu$m activating light is injected, the EDF 23 amplifies a photo signal with a bandwidth of 1.55 $\mu$m.

Numeral 24 denotes an output monitoring photo coupler; 26 denotes an activating laser beam source (referred to as the activating LD); 27 denotes an automatic output power control (APC) circuit; and 28 denotes a photo detector (PD).

When a multi-wavelength signal is transmitted from an input side (IN), only the wavelength (signal) with the wavelength number information laid thereon is extracted by the WDM photo coupler 8 and transmitted to the wavelength number information management section 12. Here, the number of wavelengths is counted. The information is transmitted to the APC 27 and at the same time to the wavelength number information WDM photo coupler 9. The wavelength is again multiplexed onto the main signal by the wavelength number information WDM photo coupler 9, and transmitted.

Also, the main signal is combined with an output light from the activating LD 26 by the activating light injecting WDM coupler 22, transmitted and amplified via the EDF 23 and transmitted to an output side (OUT) as an output signal. However, part of the output signal is branched by the output monitoring photo coupler 24. Its output level is monitored by the PD 28. The information is then transmitted to the APC 27.

The APC27 determines a batch-amplification value in accordance with the number of multiplexed wavelengths based on the output level from the PD28 and the wavelength number counted information from the wavelength number information management section 12 in such a manner that the light power of each signal reaches an optimum power, and performs a feedback control in such a manner that the output power constantly becomes the amplification value.

As aforementioned, in the photo signal amplification transmission system of the invention, even when the multi-wavelength signal is transmitted, amplification can be controlled in accordance with the number of light wavelengths which are multiplexed at the transmission end, the relay point and the receiving end, respectively. The light power is kept constant in the unit of each signal. The input levels of the signals transmitted to the receivers at the receiving end can be optimized. Even when there is a change in the number of wavelengths in the transmitted multi-wavelength signal, a stable receiving level can be secured.

Also, since the input level of each receiver can be optimized, the input dynamic range of the receiver can be narrowed. An inexpensive receiver can be used or another effect is provided.

What is claimed is:

1. A photo signal amplification transmission system for amplifying to a desired level a photo signal to be transmitted via an optical fiber cable and transmitting the photo signal at a transmission end, the photo signal to be transmitted is a multi-wavelength signal constituted of plural multiplexed signals having different wavelengths and a wavelength number information signal identifying a number of wavelengths in the photo signal, the photo signal amplification transmission system comprising:

an amplifying means controlled in accordance with the number of wavelengths identified in the wavelength number information signal; and means for batch-amplifying the photo signal to the desired level in accordance with the number of wavelengths before being transmitted.

2. The photo signal amplification transmission system according to claim 1 wherein said amplifying means is provided with an activating laser beam source, a WDM (wavelength division multiplex) photo coupler for combining an activating light from the activating laser beam source with said multi-wavelength signal and an erbium doped fiber.

3. The photo signal amplification transmission system according to claim 1 wherein the amplifying means is controlled in accordance with said number of wavelengths by monitoring the amplified output and transmitting said wavelength number information to an APC circuit for feedback-controlling the activating laser beam source.

4. A photo signal amplification transmission system for amplifying to a desired level a photo signal transmitted via an optical fiber cable and transmitting the photo signal at a relay point, said transmitted photo signal is a multi-wavelength signal constituted of plural multiplexed signals having different wavelengths and a wavelength number information signal identifying wavelength number information, said photo signal amplification transmission system comprising:

a wavelength number information management section for receiving and transmitting the wavelength number information; and an amplifying means controlled in accordance with the wavelength number information obtained by said wavelength number information management section;

wherein the photo signal is batch-amplified to the desired level in accordance with the wavelength number information before being transmitted.

5. The photo signal amplification transmission system according to claim 4, wherein said wavelength number information management section separates and receives a wavelength number information signal which is transmitted while being multiplexed on a main signal by using a wavelength different from the wavelength of the photo signal (main signal) transmitted from the transmission end via said optical fiber cable, and multiplexes the wavelength number information signal onto the main signal which has been amplified by the amplifying means by using the wavelength different from the wavelength of the main signal before transmitting the wavelength number information signal.

6. A photo signal amplification transmission system for amplifying a photo signal transmitted via an optical fiber cable to a desired level at a receiving end, said transmitted photo signal is a multi-wavelength signal constituted of plural multiplexed signals having different wavelengths and a wavelength number information signal identifying wavelength number information, said photo signal amplification transmission system comprising:

means for receiving the wavelength number information from the wavelength number information signal; and an amplifying means controlled in accordance with the wavelength number information obtained by said means;

wherein the photo signal is batch-amplified to the desired level in accordance with the number of wavelengths.

7. The photo signal amplification transmission system according to claim 6, wherein said means for receiving said wavelength number information separates and receives the a wavelength number information signal which is transmitted while being multiplexed on said main signal by using a wavelength different from the wavelength of the photo signal (main signal) transmitted from the transmission end or the relay point via said optical fiber cable.

* * * * *